Dec. 11, 1962  R. L. WHITE ET AL  3,068,365
CONTROL CIRCUITS
Filed May 13, 1957  2 Sheets-Sheet 2

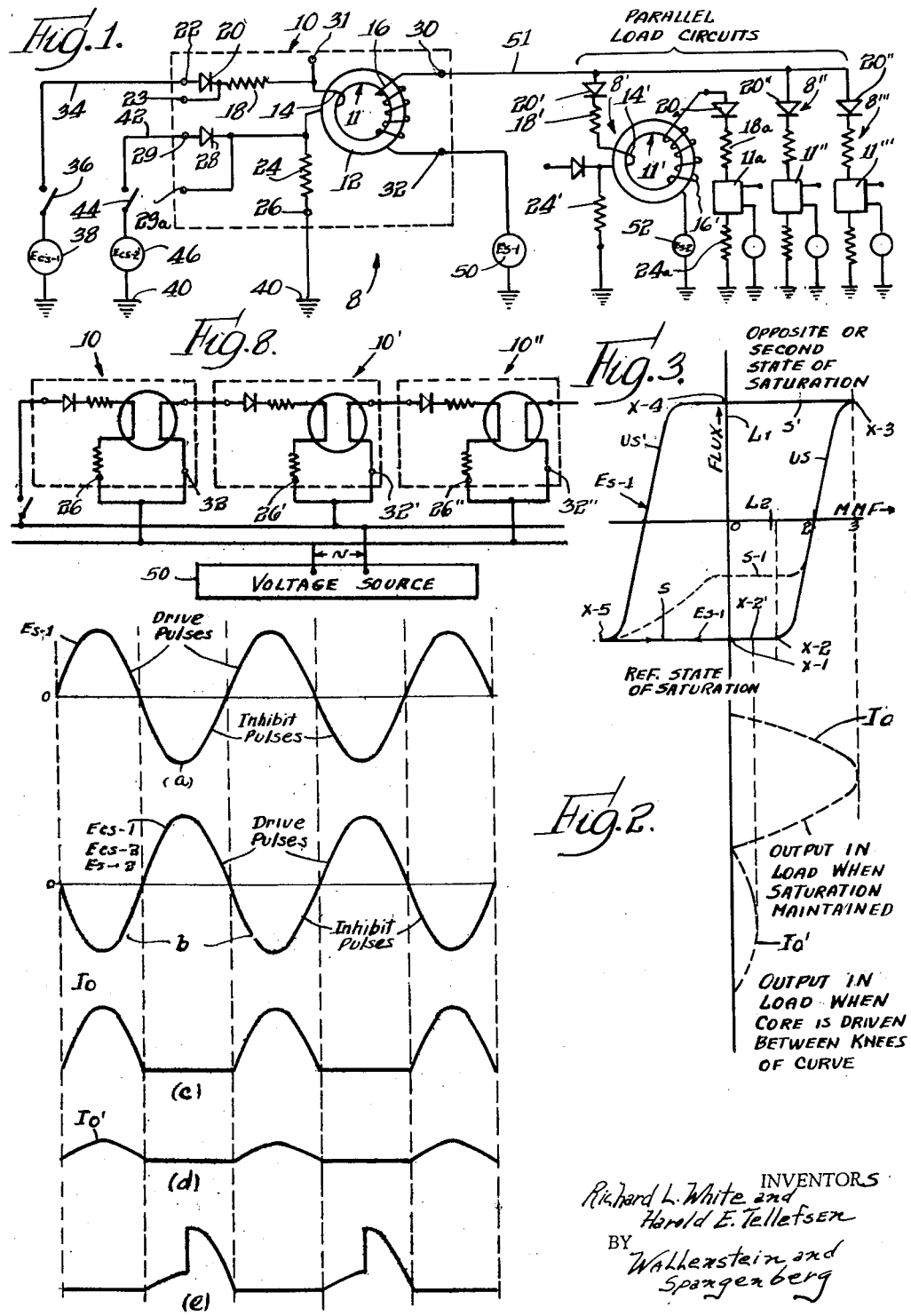

INVENTORS
Richard L. White and
Harold E. Tellefsen
BY
Wallenstein & Spangenberg

.  .  .

United States Patent Office 3,068,365
Patented Dec. 11, 1962

3,068,365
CONTROL CIRCUITS
Richard L. White, Skokie, and Harold E. Tellefsen, Chicago, Ill., assignors, by mesne assignments, to Information Systems, Inc., Skokie, Ill., a corporation of Illinois
Filed May 13, 1957, Ser. No. 658,657
10 Claims. (Cl. 307—88)

This invention relates to magnetic core control circuits, more particularly to magnetic core control circuits operating with cores having rectangular hysteresis curves and capable of being driven into opposite states of magnetic saturation by control pulses of proper polarity fed to the input windings thereof.

One of the most desirable characteristics in circuit components in control and computer equipment is reliability. Electron tubes and to a lesser but significant extent relays, are subject to limited life for a variety of reasons. In electron tubes, the electron emitting qualites of the tubes decay with age and, with relays, contacts wear away. Transistors have met with success in certain applications but they have many limitations which make them unsatisfactory for many control circuit and computer functions.

In recent years, great strides have been made in the development of magnetic core elements for control circuit and computer applications having a practically unlimited life. These magnetic core elements have a rectangular hysteresis curve which make the core elements usable as control elements. When the core is driven by a magnetomotive force of a polarity to change the magnetic state of the core, the magnetic saturated state of the core is reversed, if the magnetomotive force exceeds a given control value. As the core is driven between opposite saturated states, the core, of course, traverses an unsaturated state where the flux in the core is changing appreciably. If the core is provided with an output winding, a pulse will be induced therein which may be used to perform certain control functions but which, in many control circuit applications, is eliminated from the load circuit.

If a signal source of alternating voltage (i.e. voltage pulsation of any given waveshape which alternate between positive and negative polarities), a rectifier and a load impedance are connected in series with the output winding, and the amplitude of the signal voltage is such that the pulses of the polarity which pass through the rectifier, to be referred to as driving pulses, are just capable of driving the core from a given state of magnetic saturation, often referred to as a second or opposite state of saturation, to a first or reference state of saturation, the core unit exhibits certain useful and interesting characteristics, now well known in the art. (The pulses having a polarity which are blocked by the rectifier have inhibit functions to be explained and will be referred to as inhibit pulses.) Some of these characteristics include the fact that, if the core is already in said reference state of saturation and said driving pulses maintain this saturated state of the core, the output winding acts like a small impedance so that practically all of the driving pulse output of the signal source will appear across the above-mentioned load impedance. If a control signal is applied across an input winding of the core, which control signal provides driving pulsations occurring between successive driving pulsations of said first-mentioned signal source and which are of a magnitude and polarity which just drive the core to said opposite state of saturation, then the next voltage pulsation of said first-mentioned signal source in the output circuit of the core will drive the core back to the so called reference state of saturation. The output winding of the core during a reversal of magnetic state acts like a high impedance relative to the load impedance, so that a relatively small (but sometimes significant) voltage pulsation from the first signal source appears across the load impedance.

Thus, the presence of said control signal in the input winding of the core between successive driving pulsations of said first voltage source will substantially eliminate any substantial output signal across the load impedance during the following half cycle when the first-mentioned signal source provides its driving pulse output, and the absence of such a control signal will result in a substantial output signal across the load impedance during such following half cycle. These two conditions of operation will frequently respectively be referred to as the no-signal and signal output condition of the circuit.

One measure of the reliability of a magnetic core control circuit is a parameter sometimes referred to as a signal to zero (or no signal) ratio, which may be defined as the ratio of the area under the load current pulsation during a signal condition of the circuit to the ratio of the area under a load current pulsation during a no-signal condition of the circuit. These areas are a measure of the relative energies delivered to the load, and the greater the above ratio the less is the likelihood of an inversion in the functions of the signal and no-signal conditions of the circuit.

The methods by which an acceptable signal to zero ratio has been obtained include the addition of a biasing circuit including rectifiers and current limiting resistors inserted in the output of each of the core units or connected to an auxiliary winding of each core unit. These biasing circuits reduced the apparent amplitude of the so called no-signal output of the core so that the following core would not be driven to the unsaturated state when a no-signal condition was involved. However, they resulted in a costly and complex magnetic control unit. Reliable rectifiers may cost as much as a dollar or more a piece, depending upon current and frequency requirements. Additional core windings also increase the cost of the core units. Moreover, these biasing circuits require rectifiers between the output windings of the cores and the load circuits. In most cases where the load was a magnetic core unit, the input circuit of the latter included its own rectifier, in addition to the rectifier connected in common with the load. If the particular core unit in question is to drive a number of loads in parallel, then the common rectifier must be sufficiently large to take the entire load current. Due to the limitations in the sizes of rectifiers available at a cost which would make the magnetic core control circuits feasible, there was a practical limitation on the number of parallel connected load circuits which could be driven by the magnetic core control unit in question.

The primary object of the present invention is to provide a magnetic core control circuit which can perform the various logical functions performed by prior magnetic core circuits with a substantially simpler, less expensive and more reliable circuit.

Another object of the invention is to provide a magnetic core control circuit which is so designed that external biasing circuits are unnecessary to obtain an acceptable signal to no-signal or zero ratio, which ensures that the no-signal condition of a magnetic core unit will not drive a similar magnetic core unit to an unsaturated condition.

Still another and very important object of the invention is to provide a magnetic core control circuit which can drive a practically unlimited number of parallel load circuits with a simple and inexpensive arrangement of circuit components.

A still further object of the invention is to provide a number of different magnetic control circuits which utilize the above-mentioned new magnetic core control circuit for performing both new and old functions in the field of magnetic core control.

In accordance with the present invention, rather than selecting an output to input winding turns ratio for core units to be cascaded based on optimum power transfer considerations and using biasing circuits to obtain acceptable signal to zero ratios, a desirable signal to zero ratio is obtained by increasing the output to input winding turns ratio of the core windings so that the ratio of the current required in the output winding to reset a given core to the current required in the input winding of the following core to set the same is substantially decreased. In such case, a no-signal output condition of the driving core, existing during the resetting thereof, which will not drive the load core to its unsaturated state, can be readily obtained without the need of external biasing means. For the core materials heretofore used with a step-up ratio based on optimum power transfer considerations, the so called no load signal in the absence of external biasing means would drive a load core far into the unsaturated state thereof. Since a satisfactory signal to no-signal or zero ratio can be obtained without requiring auxiliary biasing circuits which require the use of a rectifier in series with the common load current, it can be seen that a given magnetic core control unit can drive any number of parallel load circuits, since the common load current does not, in such case, pass through any current-rated devices, such as a rectifier, other than the core output winding and the power supply.

In one example, an input to output winding step-up ratio of one to five was found highly satisfactory. For optimum maximum power transfer, a step-up ratio of one to two is required.

In accordance with a preferred form of another aspect of the invention, a unique simple basic magnetic control circuit is provided utilizing a standard plug-in unit which provides great flexibility in adapting the basic circuit to a number of different uses. The standard plug-in unit contains the above-mentioned magnetic core unit. A first main input load impedance, preferably a resistor, is connected between one end of the input winding of the core unit and a plug-in terminal which, for most applications, is connected to a reference point, which may be ground. A first non-linear impedance, such as a first rectifier, and preferably another impedance, preferably, a current-limiting resistor are connected in series with the other end of the input winding, and the other end of the series circuit is connected to a plug-in terminal, to be referred to as a "not" signal input terminal. Another plug-in terminal, to be referred to as an inhibit signal input terminal, is connected either directly to or through a second rectifier to the end of said reference point connected input load resistor nearest the input winding of the core. In addition, other plug-in terminals are preferably provided which connect directly with the ends of the input windings and to the junction point between said first rectifier and resistor.

The output winding of the core unit is connected between a pair of plug-in terminals, one of which is connected with an external load circuit connecting with said reference or ground point. The load circuit may theoretically be any load device such as the input circuit to a transistor or vacuum tube amplifier, a filament of a light bulb, etc. In most control circuit applications, at least some of the core unit loads will be the input circuit to another magnetic core unit. In any event, the load should include a third non-linear impedance, such as a third rectifier. A main signal source which provides a series of pluses alternating polarity is connected between the other plug-in terminal and said reference point. The third rectifier is oriented in the circuit so that the pulses which pass through the third rectifier will drive the core of the plug-in unit from a second or opposite state of saturation back to a reference or first state of saturation. Preferably, as in the above-described aspect of the invention, there are no current-rated devices connected between the load circuit and the main signal source and output winding of the core unit in question.

Other objects, advantages and features of the present invention will become apparent upon making reference to the specification to follow, the claims and the drawings wherein:

FIG. 1 shows a magnetic control circuit constructed in accordance with the present invention;

FIG. 2 shows the various signal waveforms in the various parts of the circuit of FIG. 1;

FIG. 3 shows a typical rectangular hysteresis curve of a core material which may be used in the present invention;

FIG. 4 shows the basic control circuit of the present invention arranged as a "not-or" gate circuit;

FIG. 5 shows the basic control circuit of the invention arranged as an "and-or" gate circuit;

FIG. 6 shows a pair of basic core units of the invention arranged to form a two stage bistable gate circuit;

FIG. 7 shows a pair of basic core units of the invention arranged to form a pulse divider circuit, and FIG. 8 shows a modified form of the invention.

Referring now more particularly to FIG. 1, the basic magnetic control circuit there shown and generally indicated by reference numeral 8 includes a plug-in unit generally indicated by reference numeral 10. The plug-in unit has a magnetic core unit 11 having a ring core 12 made of a magnetic material which has a generally rectangular hysteresis characteristic represented in FIG. 3. This characteristic has a reference saturation segment S, a steep unsaturated segment US merging with opposite or second saturated state segment S', and a steep unsaturated segment US' joining the reference saturation segment S. The core unit 11 has an input winding 14 and an output winding 16 most preferably having a substantially greater number of turns than the input winding. In prior magnetic control circuits, the prime consideration in determining the ratio of the turns of the output to the input windings was optimum transfer of power to the core, which usually involved a step-up turns ratio of one to two. In accordance with one aspect of the present invention, the turns ratio is not determined by considerations of maximum power transfer to the core, but rather through considerations which provide a good signal to zero ratio without external biasing means. In one example, with a core material having the hysteresis characteristic of FIG. 3, an output to input winding turns ratio of five to one gave highly satisfactory results. However, it should be understood that the optimum or most desirable turns ratio will vary with the particular core material being used.

The plug-in unit 10 further includes a series circuit connected to the uppermost end of the input winding 14, which series circuit comprises a current-limiting resistor 18 and a rectifier 20 connected to a "not" control signal input terminal 22, which may be a prong of the plug-in unit. An "or" signal plug-in input terminal 23 is provided which is connected to the junction of the rectifier 20 and resistor 18. The other end of the input winding 14 is connected through an input load resistor 24, which is preferably of the same value as the resistor 18, connected to a plug-in terminal 26 which is usually externally connected to a common reference or ground point 40 for the circuit. The end of the common-point connected resistor 24 nearest the input winding 14 may be connected through a rectifier 28 to an inhibit control signal input plug-in terminal 29 if it is desired to include the rectifier 28 in the plug-in unit. A second "or" inhibit input plug-in terminal 29a is provided which is connected directly to the top of the input load resistor 24. In case the signal inhibit terminal is not to be used for a particular application, the rectifier 28 is not wired into the plug-in unit. The user may still add an inhibit signal input without disturbing the plug-in unit by simply connecting such signal to the "or" terminal 29a. Even when the rectifier 28 is initially wired into the plug-in unit, the "or" terminal 23 is available for "or" connections in a manner to be explained. Also, for certain applications, a direct connection to the upper end of the input winding 14 may be desired. Thus, a plug-in terminal 31 is provided. The ends of the output winding 16 are respectively connected to a signal output plug-in terminal 30 and a main signal input plug-in terminal 32.

The "not" signal input terminal 22 of the plug-in unit 10 is connected via the line 34 to a suitable switch or gating unit 36. This switch unit may be another magnetic control circuit of the type now being described which, depending upon the input conditions thereof, will provide an output or no output at the "not" signal input terminal 22. A control signal source 38 is connected between the switch 36 and the common or ground point 40 of the circuit. The control signal source 38, for example, may have an alternating sinusoidal waveform as shown in FIG. 2b or it may comprise pulses of square or other waveshape which are alternating polarity and each being one-half cycle wide or even only a fraction of a one-half cycle wide. An alternating signal source may be said to comprise a first series of a spaced-apart unidirectional pulses occurring during alternate half cycles and a second series of unidirectional pulses of opposite polarity occurring during the other alternate half cycles. The rectifier 20 in series with the control signal source 38, however, blocks out any current from the input winding 14 resulting from one of the series of the unidirectional pulses of the alternating source. The latter pulses, however, serve the purpose of cancelling out or inhibiting the effect of pulses induced in the input winding 14 when under the core 11 is driven from its opposite to its reference state of saturation by the driving pulses in the output winding 16. The other pulses will be referred to as drive or driving pulses.

The energy and direction of flow of the driving pulses which pass through the rectifier 20 and the input winding 14 are such that they will just drive the core from the above-mentioned reference state of saturation represented by curve segment S in FIG. 3, to the positive saturation point x-3 of the opposite or second state of saturation, represented by the curve segment S' therein. When the magnetic core 12 is in a quiescent state with no current flowing through the windings thereof, the core state can be represented by the point x-1 on the saturation curve segment S in FIG. 3, located at the zero ordinate line L1, representing zero ampere turns or magnetomotive force (M.M.F.), or the corresponding point x-4 on the other saturation curve segment S'.

The inhibit control signal input terminal 29 of the magnetic control circuit now being described is connected to a gating or switch unit 44, which again may be a magnetic control unit similar to the one now being described, which selectively provides a signal output or no signal output depending upon the signal input conditions thereof. A control signal source 46 is connected between the switch unit 44 and the common or ground point 40 of the circuit. The magnitude and waveshape of the output of control signal source 46 is preferably identical to the magnitude and waveshape of the control signal source 38 and, therefore, is shown by FIG. 2b. The rectifier 28 in series with the control signal source 46 blocks out current flow for control signal pulsations of one polarity, leaving as effective driving signals the opposite unidirectional pulses thereof. The rectifiers 20 and 28 associated with the signal input terminals 22 and 29, respectively, are similarly arranged so that the pulses pass thereby are of the same polarity and occur at the same instants of time. Therefore, when the switch or gating units 36 and 44 pass the signal pulsations of the associated control signal sources at the same time, the same voltage is applied to the opposite ends of the input winding 14 so that no current flows therein. In effect, it may be said that the control signal source 46 when connected to the inhibit signal input terminal inhibits the effect of the control signal source 38 in the input winding of the core unit 11. The resistor 18 in series with the upper end of the winding 14 acts as a current-limiting resistor which prevents the inadvertent triggering of the magnetic core unit 11 due to small differences in the magnitudes of the control outputs of the signal sources 38 and 46.

The output of the magnetic control circuit 8 originates in a main signal source 50 connected between the signal input terminal 32, connected to the bottom end of the output windings 16, and ground. The main signal source 50 may have the waveform shown in FIG. 2a and is effectively 180° out of phase with the control signal sources 38 and 46. The signal output terminal 30 connected to the upper end of the output winding 16 is connected via a line 51 to the particular load circuit or circuits to be operated by the magnetic control circuit 8. One of the major advantages of the present invention is realized when a relatively large number of parallel load circuits are to be driven by the output of the magnetic core unit 11. Each load circuit to be associated with the magnetic core unit 11 includes a rectifier 20', 20" or 20''', associated with respective magnetic core control circuits 8', 8" or 8''', which is arranged to block current flow in the output loop circuit, including the output winding 16 and the main signal source 50 resulting from the alternating main signal source, which would drive the core 12 from its main reference state of saturation to its opposite state of saturation. The connection of the main signal source 50 to the output winding 16 is such that the unidirectional voltage pulsations thereof which pass through the load circuit rectifiers 20', 20", 20''', etc., occur one-half cycle after the driving pulses of the control signal sources 38 and 46. These drive pulsations of the main signal source 50 will be in a direction to drive the core 12 from said opposite or said second state of saturation back to the reference state of saturation, thereby performing what might be called a resetting operation. The energy in the drive pulsations of the main signal source 50 is just sufficient that the core is driven from the state represented by the point x-4 on the hysteresis curve (FIG. 3) to the negative saturation point x-5. When the pulse reaches zero, the state of the core will then be represented by the point x-1 at the ordinate line L1.

When the drive pulses of the main signal source 50 are used to reset the magnetic core 12 to the reference state of saturation thereof, substantially all of the energy is utilized in the switching operation and little appears across the output load circuits or circuit. Due to the load circuit rectifiers 20', 20", 20''', etc., the only output signals which can appear across the load devices connected between these rectifiers and ground are the pulsations caused by the so called drive pulses of the main signal source 50. These occur, of course, one-half cycle following the drive pulsations from the control signal sources 38 and 46 associated with the input of the magnetic core unit 11. FIGS. 2c and 2d represent the current or voltage pulsations which are present between the low voltage sides of the load circuit rectifiers 20', 20" or 20''' and ground during signal output and no-signal output conditions of the magnetic core control circuit 8. The output signal condition across the output load circuits during resetting of the magnetic core unit 11 is relatively small, as shown in FIG. 2d, and can be referred to, therefore, as a no-signal output condition which is of insufficient magnitude to operate the particular load circuit or circuits in question. When the magnetic core unit 11 is already in the reference state of saturation, when the drive pulses of the main signal source 50 are fed through the output winding 16, then the output winding 16 acts like a practically zero impedance so that substantially all of the output of the main signal source 50 appears across the output load circuits. FIG. 2c represents the waveform and phase of the output signals during this condition of operation of the magnetic core unit 11, and represents the so called signal output condition of operation of the magnetic control circuit 8.

In the example illustrated in the drawings, each output load circuit includes a magnetic core unit 11', 11'' or 11''' having input circuits substantially identical to the input circuit just described in connection with the magnetic core unit 11. Thus, the input circuit to core unit 11' includes a rectifier 20' corresponding to rectifier 20 connected to a limiting resistor 18' corresponding to resistor 18, a core input winding 14' corresponding core input winding 14, and an input load resistor 24' corresponding to resistor 24 leading to the common or ground point of the system. The core unit 11' has an output winding 15' preferably having a substantially greater number of turns than the primary winding 14', such as a ratio of one to five, and the output winding 16' is connected in a loop circuit including the input circuit to another magnetic core unit 11a and a second main signal source. The input circuit to the magnetic core unit 11a, therefore, comprises a rectifier 20a, a current limiting resistor 18a and an input load resistor 24a at the opposite end of the magnetic core unit 11a, connected to ground. The second main signal source 52 serves the same resetting function for the core unit 11' as the first-mentioned main signal source 50 serves for the magnetic core 11. Since the drive control pulses at the input to a particular core unit are to occur between the drive pulses of the associated main signal source in the output of the magnetic core unit involved, it is clear that FIG. 2b may represent the waveform of the second main signal source. It can be seen, therefore, that voltage source 52 and control signal source 38, and control signal source 46 for that matter, may all be one and the same alternating voltage source.

If each of the parallel load circuits includes a magnetic core unit similar to the magnetic core unit 11, then the current pulses fed therethrough during the signal output condition of the control circuit 8, when the saturation of the core unit 11 is being maintained, must have a sufficient energy content to trigger the load core from its reference state of saturation to the opposite state of saturation. Of great importance also is the fact that the so called no-signal output of the magnetic control circuit 8 must not trigger the load. Considering for a moment that only a single load circuit is connected to the output of the magnetic core unit 11, the impedance offered by the input circuit to the core unit involved must not be greater than that required to insure a magnetization current flow due to the main signal source 50 which has sufficient energy to trigger the magnetic core 11 from a second or opposite state of saturation, represented by the curve segment S' in FIG. 3, to the reference state of saturation, represented by the curve segment S. This magnetization current may be represented by the waveform $Io'$ shown in FIG. 2d. If additional and similar load circuits are connected in parallel with the load circuit just being discussed, then, obviously, the magnetization current will be even greater than the minimum amount required to reset the core unit 11, since the effect of the parallel load circuits is to lower the resultant load impedance.

Assuming that the magnetic core unit 11' has the same hysteresis characteristic as the magnetic core 11, then the ampere turns or magnetomotive force produced by the no-signal current $Io'$ flowing in the input winding 14' must not reach the nearest knee point $x-2$ (FIG. 3) defining the beginning of the unsaturated state of each load core. As shown in FIG. 3, the peak of the no-signal current $Io'$ drives the load core in question only to the point $x-2'$ which is spaced substantially from the knee point $x-2$. During the signal output condition of the magnetic core unit 11, the output current signal $Io$ from the core unit 11 shown in FIG. 3 should have sufficient energy to drive each load core to the opposite state of saturation, represented by current segment S'. The integral of a current pulsation over a half cycle (area under current pulse) is a measure of the energy in this current pulsation. The integral of a no-output current pulsation $Io'$ over a half cycle is a measure of the energy of a no-signal current pulsation. The ratio of the energy in the signal and no-signal current pulsations is referred to as the signal to zero ratio. The effect of a current pulsation in a winding is a function of the number of winding turns through which such current flows, so that the effective energy of a current pulsation is measured by the total area under the current involved times the number of windings through which the current pulsation passes. Thus, a no-signal current pulsation $Io'$ will have the same effect in the output winding 16 of a core unit as a much larger signal current pulsation $Io$ flowing through the much smaller number of turns in the input winding of the following cascaded core unit. As long as the non-output signal $Io'$ of a core unit flowing through the input winding of the following cascaded core unit does not drive the latter core unit to its unsaturated state, the signal to zero ratio at any particular core unit in a cascaded chain of similar core units will never be smaller than the signal to zero ratio of each core unit.

It can be shown that when a no-signal current pulsation drives the following core into its unsaturated state but substantially below the opposite point $x-3$ of the hysteresis curve, that the operating condition of the core will change to a secondary hysteresis curve, represented by the dotted line S–1 in FIG. 3. In such case, the main drive signal pulsation of the main signal source in the output circuit of the magnetic core unit involved will reset the core back to the reference state of saturation represented by the core segment S. The output current pulsation resulting therefrom, instead of being a current pulsation, representing a signal output condition of the core unit, will be a partial pulse represented by one of the current pulsations in FIG. 2e. Since the energy of the pulse is a function of the area under a curent pulsation, it can be seen that the area under this pulsation is substantially less than the area under a normal signal pulsation $Io$ so that the former current pulsation will not be able to drive a magnetic core unit between its opposite desired states of saturation.

It can be shown that a good measure of reliability of a magnetic core control system comprising two or more magnetic control circuit elements or stages is the signal to zero ratio. When the signal to zero ratio is relatively small, the circuit will be more sensitive to small variations in energy levels between the signal and no-signal conditions of the magneti core units, for a small fluctuation in the signal voltage which increases the energy of a no-signal current pulsation may act like a signal condition, and a small fluctuation thereof which decreases a signal current pulsation may act like a no-signal condition.

Instead of using external biasing means for building up an acceptable signal to zero ratio, the present invention does so by increasing the input to output windings turns ratio above that normally heretofore provided, where the step-up ratio was based primarily on maximum power transfer considerations. It can be shown that the signal to zero ratio is never less than the step-up ratio where similar magnetic core units are cascaded or connected in series and, if the number of magnetic core circuits connected in parallel at the output of a magnetic core control stage is increased, the signal to zero ratio increases also. The building up of the signal to zero ratio by increasing the step-up ratio of the input and output windings of a core enables the elimination of external biasing sources and their associated rectifiers in series with the output line leading to the load circuits. Such rectifiers must have a current rating equal to the sum of the load currents, and, when a large number of loads are involved, this rating may become quite excessive and render the control circuit impractical, unless additional core units are added. The present invention enables a practically unlimited number of load circuits to be driven in parallel by a single magnetic core unit.

Besides the advantages of obtaining a satisfactory signal to zero ratio without external biasing means and the omission of a rectifier carrying common load current where parallel load circuits are involved, the circuit just described has numerous advantages in its simplicity, low cost and flexibility. It may readily be arranged to perform different functions with a minimum of components. Refer now more particularly to FIG. 4, which shows a circuit which may be referred to as a "not-or" circuit. This circuit, as well as the other circuits shown in FIGS. 5 through 7, utilize the basic plug-in unit 10 or 10' shown in FIG. 1. (In FIGS. 4 through 7, the magnetic core unit 11 or 11' has been diagrammatically indicated, it being understood that the diagrammatic representation represents identically the magnetic core unit 11 previously described.) In the "not-or" circuit of FIG. 4, there are no external connections made to the inhibit input terminal 29. Instead of a single input to the upper end of the input winding, a number of parallel or alternate connections are made thereto. The control signal source 38 is connected to the "not" input terminal 22 through a gating or switching unit 36a which, could be another magnetic core control unit similar to the kind just described, wherein the closing of the switch unit indicates the presence of a control signal corresponding to that shown in FIG. 2c, and the opening of the switch unit represents the absence of a signal at the output of the switch unit. Other similar switch units 36b and 36c are respectively connected between the control signal source 38 and respective rectifiers 20b and 20c connected to the signal input terminal 23. The rectifiers 20b and 20c are oriented in the same direction as rectifier 20. All other portions of the circuit are identical to corresponding portions of the circuit shown in FIG. 1, and the various components thereof have been numbered similarly to corresponding components in FIG. 1. Also, the load circuit connected in series with the output winding 16 of the magnetic core unit 11 is assumed to be a similar magnetic core control unit 11' with a similar input circuit. It should be clear that, as long as all of the switch units 36a, 36b and 36c are open, the main signal source 50 will continuously feed current pulses through the output winding 16 in a direction to maintain the saturated condition of the core and provide a signal output at the signal output terminal 30.

Refer now to FIG. 5 which shows an "and-or" circuit constructed from the basic plug-in unit 10. In this circuit, control signals are available at both signal input terminals 22 and 29 as in the basic circuit shown in FIG. 1. The control signal source 38 is continuously fed to the "not" signal input terminal 22 so that upper end of the input winding 14 of the core unit 11 is continuously fed by spaced-apart unidirectional voltage pulses which, in the absence of a similar voltage appearing at the bottom end of the input winding 14, will provide a no-signal condition in the output of the core unit 11. The second control signal source 46 is connected through a gate or switch unit 44a to the inhibit signal input terminal 29 associated with the rectifier 28 leading to the upper terminal of the common point connected input load resistor 24. Thus, when the switch unit 44a is closed, the control signal pulsations appearing at the upper end of the resistor 24 will inhibit or cancel out the effect of the signal pulsations fed to the upper end of the input winding 14 from the control signal source 38.

Besides the inhibit control signal input path through the switch unit 44a two other parallel connected signal input paths are shown extending from the control signal source 46 respectively through switch or gating units 44b and 44c through respective rectifiers 28b and 28c extending to the "or" input terminal 29a which is connected directly to the upper terminal of the common-point connected resistor 24. The rectifiers 28b and 28c are arranged in the circuit similarly to the rectifier 28, so that spaced-apart inhibit voltage pulsations are available at the outputs of these respective rectifiers 28, 28b and 28c which are capable of inhibiting or cancelling out the effect of the signal pulsations fed from the control signal source 38 to the "not" input terminal 22. When all the switch units 44a, 44b and 44c are in their no-signal or open positions, then the voltage pulsations from the control signal source 38 will be continuously fed to the terminal 22 resulting in a typical "not" circuit operation. In such case, a no-signal output condition exists in the output circuit of the magnetic core unit 11. On the other hand, if any of the switch units 44a, 44b or 44c are closed to couple the control signal source 46 to the bottom of the input winding 14, an inhibit action will result so that a signal condition will exist in the output loop circuit of the magnetic core unit 11. The load circuit connected to the output of the magnetic core unit 11 is the same as described in connection with FIG. 4.

Refer now to FIG. 6 which shows the two basic plug-in units 10 and 10' arranged to form a bistable memory circuit. In this circuit, the output of one of the plug-in units is fed to the input of the other plug-in unit, and the output of the latter plug-in unit is fed back to the "not" input of the first-mentioned plug-in unit. In such case, opposite output conditions of the associated core units are always present. By feeding an inhibit or set signal to the input of the core unit having a no-signal output condition because of a signal condition existing at the "not" input thereof, a signal condition at the output of the core unit in question will be generated which will reverse the signal output condition of the other core unit until a reset inhibit signal is fed to the inhibit input of the latter core unit. When the reset signal is so fed, the opposite signal output condition of the core units is again reversed. More specifically, the relationship of the two plug-in units 10 and 10' is as follows. The signal output terminal 30 connected to the upper end of the output winding 16 of the first plug-in unit 10 is connected to the "not" signal input terminal 22' of the second plug-in unit 10'. The signal input terminal 32 connected to the bottom end of the output winding 16 of the first core unit 11 is connected to the main signal source 50 having an output waveform shown in FIG. 2a. The inhibit terminal 26' connected to the bottom end of the common-point connected input resistor 24' of the second plug-in unit 10' is grounded, as in all the other circuits described, so that an output loop circuit is provided, including in mutual series circuit relationship, the main signal source 50, the output winding 16 of the first magnetic core unit 11, rectifier 20', current-limiting resistor 18', input winding 14' of the second magnetic core unit 11' and the common-point connected input resistor 24'.

The main signal input terminal 32' of the magnetic core unit 11' is connected to a second main signal source 52 having an output with the phase and waveform shown in FIG. 2b. The phase of this output is spaced one-half cycle from the output of the main signal source 50. The signal output terminal 30' connected to the upper end of the output winding 16' of the magnetic core unit 11' is connected via a line 51 to the "not" signal input terminal 22 of the plug-in unit 10, so that any output signal appearing in the second output core unit 11', which signal will always be spaced one-half cycle from the main signal source 50 at the output side of core unit 11, will be fed to the "not" terminal of the input winding 14 of the first magnetic core unit 11, to trigger the same to a no-signal output condition, as long as no inhibit signal appears on the inhibit signal input terminal 29 of the plug-in unit 10. A normally-open set pushbutton switch 44 is provided for momentarily feeding an inhibit signal to the inhibit signal input terminal of the plug-in unit 10. This will change the no-signal output condition of core unit 11 to a signal condition and the signal output condition of core unit 11' to a no-signal condition. In order to reverse the signal-output conditions of the magnetic core unit 11', a normally-open reset pushbutton switch 44' is provided between the inhibit signal input terminal 29' of the second plug-in unit 10' and the main signal source 50. Upon momentary closure of the pushbutton 44', inhibit pulses of the same phase as the "not" input signals to core unit 11' will be fed from the main signal source 50 to change the no-signal output conditions of core unit 11' to a signal condition and the signal condition of core unit 11 to a no-signal condition.

Refer now to FIG. 7 which shows what may be referred to as a pulse divider circuit wherein for every two driving pulses of the control signal source 38 one pulse will appear in the output of the circuit. Again, two identical plug-ins 10 and 10' are associated together so that the signal output terminal 30 of the first core unit 11 is connected to the "not" signal input terminal 22' of the right hand core unit, so that the output of the core unit 11 becomes the input to the core unit 11'. Except for the connections to the input circuit of the first core unit 11, all other portions of the circuit are identical to the bistable circuit of FIG. 6. Instead of feeding the output of the second core unit 11' to the "not" signal input terminal 22 leading to the upper end of the input winding 14 of the core unit 11 as in the bistable circuit of FIG. 6, the output of the core unit 11' is fed to the inhibit signal input terminal 29 of the first core unit 11. Also, the control signal source, instead of being fed through a pushbutton switch to the inhibit input terminal of the first core unit 11, is continuously fed to the "not" signal input terminal 22 associated with the upper end of the input winding 14 of the first core unit 11. No inhibit input is fed to the inhibit input terminal 29' associated with the second core unit 11'.

The operation of the circuit can be explained as follows. When the first drive signal pulse is fed to the "not" input terminal 22, it will trigger the core unit 11 from its reference state of saturation to its opposite state of saturation. During the following half cycle, the drive pulse fed to the output winding 16 from the main signal source 50 will reset core unit 11, resulting in a no-signal condition in the output of the core unit 11. When a no-signal output condition exists at the input of the next core unit 11', an output signal will appear at the output of the core unit 11' during the next half cycle when the main signal source 52 feeds a drive pulse to the output winding 16' as to maintain the state of saturation thereof in its reference state of saturation. As in the bistable circuit in FIG. 6, the drive pulses of the control signal source associated with the input of the first core unit 11 and the main signal source 52 at the output of the second core unit are coincident, so that one full cycle after the aforementioned drive pulse generated by the control signal source at the input to core unit 11, an output pulse will appear at the output of the second core unit 11', which is fed to the inhibit signal input terminal 29 of the first core unit 11, thereby inhibiting the effect of the second active pulse generated by the control signal source 38. When this occurs, an output signal condition appears in the output of the core unit 11 which triggers the second core unit 11' from its reference to its opposite state of saturation, resulting in a no-signal output condition at the output of the core unit 11'. In such case, a no-signal condition exists at the inhibit signal input terminal 29 of the first core unit, so that the third drive pulse generated by the control signal source 38 will trigger the core unit 11 to provide a no-signal output condition thereof. One-half cycle later, a signal output pulse appears at the output of core unit 11', so that an output pulse appears in the output of core unit 11' for every two drive control pulses fed to the "not" input terminal of core unit 11. The output circuit of the core unit 11' will, of course, include a load circuit which will include a rectifier 20" which blocks out the unused pulses of the main signal source 52 driving the output winding 16' of the core unit 11'.

The present invention has provided a basic magnetic core circuit which can drive a very large number of load circuits, limited primarily only, of course, by the current limitations of the power supply, the size of the wire from which the windings are made and by the current rating of the rectifier in each load circuit. Since the latter rectifier does not carry common load current, it is not a limitation on the number of loads but merely on the current per load. Moreover, the present invention accomplishes similar logical functions than prior magnetic core control circuits with substantially fewer and less costly components. It is extremely flexible due both to the arrangement of the components and the design of the plug-in unit which accommodates them.

The equipment can be made very compactly when the power supply frequency is in the order of at least 100 kc. A plug-in unit above described may be easily made with over-all dimensions about one to one and one-half inches in diameter and one-half to one inch thick.

It should be understood that numerous modifications may be made in the specific embodiments of the invention above described without deviating from the broader aspects of the invention.

As an illustrative but not limiting example, in the broad generally aspect of the invention, the magnetic core control circuits of the invention need not have a common reference or ground point for the various cascaded magnetic core control circuits, as shown in FIGS. 1 and 4–7, and the signal source need not be separate sources each having a pair of output terminals, one grounded and the other not, across which a voltage of opposite phase to the voltage across the output terminals of the other signal source appear. Rather, the voltage sources, symbolically shown by the numbered circles, could be a single source with only two output terminals across which an alternating voltage appears. Each terminal can be said to provide an alternating voltage with respect to a theoretical or phantom ground which is opposite to the voltage between the opposite terminal and the phantom ground. In such case, the terminals 26—32, 26'—32' or 26"—22" of each plug-in unit 10, 10' or 10" are connected together, as shown in FIG. 8, and the jointed terminals of successive plug-in units are connected to opposite terminals of the single two terminal voltage source 50.

In the claims, the reference to separate main signal sources generally includes the terminals of separate signal sources or the respective terminals of a single source having a phantom ground as above explained.

We claim as our invention:

1. A magnetic core control circuit comprising a first magnetic core unit including a magnetic core with a generally rectangular hysteresis characteristic and an input core winding and an output core winding having a step-up turns ratio, a first main alternating signal source for providing a series of spaced-apart drive pulses of one polarity and intervening inhibit pulses of opposite polarity, a first alternating control signal source for providing spaced-apart drive pulses coincident with but of opposite polarity to said inhibit pulses of said first main signal source and intervening inhibit pulses coincident with but of opposite polarity to said drive pulses of said first main signal source, a second control signal source for selectively providing an inhibit pulse coincident with and of the same as any one of a number of said drive pulses of said first control signal source, a common input point, said first control signal source being connected between one of the ends of said input winding and said common point, an input impedance connected between the other end of said input winding and said common input point, said second control signal source being connected between the end of said input impedance nearest said input winding and said common point wherein said second control signal source is in a loop circuit which is independent of said input winding and first control signal source, a load circuit connected in a series loop circuit including said output winding and main signal source, said load circuit including an output load device and a rectifier connected to pass current in said loop circuit generated by said drive pulses of said main signal source, said drive pulses of said main signal source having a magnitude and polarity which will reset the associated core by driving it substantially only from a given state of saturation to an opposite reference state of saturation, wherein substantially no signal will appear in said load device, and, when the associated core is already in said reference state of saturation, will provide a signal in said load device which will set a magnetic core in such load circuit, said drive pulses of said first control signal source, which occur between said drive pulses of said main signal source, having a magnitude and polarity which, in the absence of an inhibit pulse of said second control signal source across said input impedance, will drive the first core substantially from said reference state of saturation to said second state of saturation, and said inhibit pulses of said first control signal source and said main signal source each inhibiting the effect of the pulses induced into the associated winding by the drive pulses of the other signal source.

2. A magnetic core control circuit comprising a first magnetic core unit including a magnetic core with a generally rectangular hysteresis characteristic and an input core winding and an output core winding having a step-up turns ratio, a first main alternating signal source for providing a series of spaced-apart drive pulses of one polarity and intervening inhibit pulses of opposite polarity, a first alternating control signal source for providing spaced-apart drive pulses coincident with but of opposite polarity to said inhibit pulses of said first main signal source and intervening inhibit pulses coincident with but of opposite polarity to said drive pulses of said first main signal source, a second control signal source for selectively providing an inhibit pulse coincident with and of the same polarity as any one of a number of said drive pulses of said first control signal source, a first rectifier connected to one of the ends of said input winding, an input impedance connected to the other end of said input winding, said first rectifier, input winding impedance and first control signal source being connected into a first loop circuit, a second rectifier, said second control signal source, input impedance and second rectifier being connected in a second loop circuit which by-passes said first rectifier and input winding, said rectifiers in series with said first and second control signal sources being arranged respectively to pass said drive pulses of said first control signal source and said inhibit pulses of said second control signal source to the opposite ends of said input winding, whereby the application of an inhibit pulse of said second control signal source to said input winding will cancel out the effect of the simultaneously applied drive pulse of said first control signal source, a load circuit connected in an output loop circuit including said main signal source and output winding, said load circuit including an output load device and a rectifier connected to pass said drive pulses of said main signal source, said drive pulses of said main signal source having a magnitude and polarity which will reset said core by driving it substantially only from a second state of saturation back to an opposite reference state of saturation, wherein substantially no signal will appear in said load device, and, when the associated core is already in said reference state of saturation, will provide a signal in said load device which will set a magnetic core which is similar to said first-mentioned core constituting such load device, said drive pulses of said first control signal source, which occur between said drive pulses of said first main signal source, having a magnitude and polarity which, in the absence of an inhibit pulse of said second control signal source, will drive the first-mentioned core from said reference state of saturation to said second state of saturation, and said inhibit pulses of said first control signal source and said main signal source each inhibiting the effect of the pulses induced into the associated winding by the drive pulses of the other signal source.

3. A magnetic core control circuit comprising a first and a second magnetic core each having the same generally rectangular hysteresis characteristic representing a reference state and an opposite state of saturation, and an input and an output winding, a first main alternating signal source providing a series of spaced apart drive pulses of one polarity and intervening inhibit pulses of opposite polarity, a second main signal source providing a series of spaced-apart drive pulses coincident with but of opposite polarity to said inhibit pulses of said first main signal source and intervening inhibit pulses coincident with but of opposite polarity to said drive pulses of said first main signal source, a first input impedance connected to one end of the input winding of said first core, a second input impedance connected to the end of the input winding of said second core corresponding to said one end of said first core input winding, means connecting in mutual series circuit relation the output winding of said first core, the input winding of said second core, said second input impedance and said first main signal source to form a first loop circuit wherein said drive pulses of said first main signal source produce current pulses which will first drive said first core to said reference state of saturation if the core is in its opposite state of saturation, and said second core to said opposite state of saturation if the core is in its reference state of saturation, a rectifier in said first loop circuit which blocks said inhibit pulses of said first main signal source, a second rectifier, a load circuit for said output winding of said second core, means connecting said second main signal source in a second loop circuit including said output winding of the second core, said second rectifier, said load circuit and said second main signal source, the drive pulses of said second main signal source being adapted to drive said second core to its reference state of saturation, if the core is in its opposite state of saturation, said second rectifier blocking said inhibit pulses of said second main signal source, a first alternating control signal source for selectively providing a series of spaced-apart drive pulses coincident with but of opposite polarity to said inhibit pulses of said first main signal source and intervening inhibit pulses coincident with but of opposite polarty to said drive pulses of said first main signal source, means connecting said first control signal source, said first input impedance and said input winding of said first core in a loop circuit, said drive pulses of said first control signal source driving said first core from its reference state of saturation to its opposite state of saturation, said inhibit pulses of said first control signal source and said main signal sources each inhibiting the effect of the pulses induced into the associated winding by the drive pulses of the other signal source, a second control signal source for selectively providing an inhibit pulse coincident with and of the same polarity as any one of a number of drive pulses of said second control signal source, and means for selectively connecting said second control signal source in a loop circuit which includes said first input impedance but which bypasses said input winding of said first core.

4. A magnetic core control circuit comprising a first and a second magnetic core each having the same generally rectangular hysteresis characteristic representing a reference state and an opposite state of saturation, and an input and an output winding, a first main alternating signal source providing a series of one polarity and intervening inhibit pulses of opposite polarity, a second main signal source providing a series of spaced-apart drive pulses coincident with but of opposite polarity to said inhibit pulses of said first main signal source and intervening inhibit pulses coincident with but of opposite polarity to said drive pulses of said first main signal source, a first input impedance connected to one end of the input winding of said first core, a second input impedance connected to the end of the input winding of said second core corresponding to said one end of said first core input winding, means connecting in mutual series circuit relation the output winding of said first core, the input winding of said second core, said second input impedance and said first main signal source to form a first loop circuit wherein said drive pulses of said first main signal source produce current pulses which will first drive said first core to said reference state of saturation if the core is in its opposite state of saturation, and said second core to said opposite state of saturation if the core is in its reference state of saturation, a rectifier in said first loop circuit which blocks said inhibit pulses of said first main signal source, a second rectifier, a load circuit for said output winding of said second core, means connecting in mutual series circuit relation said second main signal source, said output winding of said second core, the input winding of said first core, said second rectifier and said first input impedance to form a second loop circuit, wherein the current pulses produced by said drive pulses of said second main signal source will substantially just drive said second core to its reference state of saturation if the core is in its opposite state of saturation, and, when said second core is in its reference state of saturation, will substantially just drive said first core from its reference state of saturation to its opposite state of saturation, said second rectifier blocking current flow from the inhibit pulses of said second main signal source, said inhibit pulses of said main signal sources each inhibiting the effect of the pulses induced into the associated winding by the drive pulses of the other signal source, means for selectively providing across said first input impedance an inhibit control pulse coincident with a selected one of said drive pulses of said second main signal source and which, if applied across the input winding of said first core in its reference state of saturation, would substantially just drive said first core to its opposite state of saturation, and means for selectively inhibiting the effect of a drive pulse in the input winding of said second core.

5. A magnetic core control circuit comprising a first and a second magnetic core each having the same generally rectangular hysteresis characteristic representing a reference state and an opposite state of saturation, and an input and an output winding, a first main alternating signal source providing a series of spaced apart drive pulses of one polarity and intervening inhibit pulses of opposite polarity, a second main signal source providing a series of spaced-apart drive pulses coincident with but of opposite polarity to said inhibit pulses of said first main signal source and intervening inhibit pulses coincident with but of opposite polarity to said drive pulses of said first main signal source, a first input impedance connected to one end of the input winding of said first core, a second input impedance connected to the end of the input winding of said second core corresponding to said one end of said first core input winding, means connecting in mutual series circuit relation the output winding of said first core, the input winding of said second core, said second input impedance and said first main signal source to form a first loop circuit wherein said drive pulses of said first main signal source produce current pulses which will first drive said first core to said reference state of saturation if the core is in its opposite state of saturation, and said second core to said opposite state of saturation if the core is in its reference state of saturation, a rectifier in said first loop circuit which blocks said inhibit pulses of said first main signal source, a second rectifier, a load circuit for said output winding of said second core, means connecting in mutual series circuit relation said second main signal source, said output winding of said second core, said second rectifier and said first input impedance to form a second loop circuit which bypasses said input winding of said first core, wherein the current pulses produced by said drive pulses of said second main signal source will substantially just drive said second core to its reference state of saturation if the core is in its opposite state of saturation, and, when said second core is in its reference state of saturation, will inhibit drive pulses fed to the input winding of said first core from setting the core into its opposite state of saturation, said second rectifier blocking current flow from the inhibit pulses of said second main signal source, said inhibit pulses of said main signal sources each inhibiting the effect of the pulses induced into the associated winding by the drive pulses of the other signal source, and a control signal source providing spaced-apart drive pulses coincident with but of opposite polarity to said inhibit pulses of said first main signal source and intervening inhibit pulses coincident with but of opposite polarity to said drive pulses of said first main signal source, and means for continuously connecting said control signal source across said input winding of said first core.

6. A magnetic core control circuit comprising a magnetic core unit including a magnetic core having a generally rectangular hysteresis characteristic, and an input core winding and an output core winding having a step-up turns ratio at least twice that required for maximum power transfer, wherein if a number of magnetic core units similar to said magnetic core unit are cascaded therewith, the signal appearing in the input winding of any core unit following another as a result of the resetting of the former core unit to its reference state of saturation will operate the latter core unit only below the nearest knee point on the hysteresis characteristic thereof in the absence of external biasing sources, an input circuit connected with said input winding and including a first signal source generating set pulses for driving said core from a reference state of saturation to a set state of saturation, a second signal source connected in series with said output winding and generating reset pulses occurring between said set pulses for resetting said core from said opposite state of saturation back to said reference state of saturation, said second signal source being the sole current source connected to said output winding, and load means connected in mutual series circuit relation with said second signal source and output winding and including a number of parallel load circuits, each load circuit including a load device and a rectifier which offers a low impedance to passage of said reset pulses, there being continuous connections devoid of current-rated devices carrying common load current between said load means, second signal source and output winding.

7. A magnetic core control circuit comprising a magnetic core unit including a magnetic core having a generally rectangular hysteresis characteristic, and an input core winding and an output core winding having a step-up turns ratio at least in the neighborhood of twice that required for maximum power transfer, wherein if a number of magnetic core units similar to said magnetic core unit are cascaded therewith, the signal appearing in the input winding of any core unit following another as a result of the resetting of the former core unit to its reference state of saturation will operate the latter core unit only below the nearest knee point on the hysteresis characteristic thereof in the absence of external biasing sources; an input circuit connected with said input winding and including a first signal source generating set pulses for driving said core from a reference state of saturation, a second signal source connected in series with said output winding and generating reset pulses occurring between said set pulses for resetting said core from said opposite state of saturation back to said reference state of saturation, said second signal source being the sole current source connected to said output winding, and load means connected in mutual series circuit relation with said second signal source and output winding.

8. A magnetic core control circuit comprising a first magnetic core unit including a magnetic core having a generally rectangular hysteresis characteristic, and an input core winding and an output core winding having a step-up turns ratio substantially greater than that required for maximum power transfer, wherein if a number of magnetic core units similar to said magnetic core unit are cascaded therewith, the signal appearing in the input winding of any core unit following another as a result of the resetting of the former core unit to its reference state of saturation will operate the latter core unit only below the nearest knee point on the hysteresis characteristic thereof in the absence of external biasing sources, an input circuit connected with said input winding and including a first signal source generating set pulses for driving said core from a reference state of saturation, a second signal source connected in seires with said output winding and generating reset pulses occurring between said set pulses for resetting said core from said opposite state of saturation back to said reference state of saturation, said second signal source being the sole current source connected to said output winding, and load means including the input winding of a second magnetic core unit like said first magnetic core unit, connected in mutual series circuit relation with said second signal source and output winding.

9. A magnetic core control circuit comprising a magnetic core unit including a magnetic core with a generally rectangular hysteresis characteristic, an input core winding and an output core winding on said core, a first signal source connected between one end of said input winding and a common point and providing set pulses for driving said core from a reference state of saturation to an opposite state of saturation, a second signal source connected between one end of said output winding and said common point and providing reset pulses occurring between said set pulses for resetting the core from said opposite state of saturation back to said reference state of saturation, a third signal source for providing inhibit pulses, an input impedance connected between the other end of said input winding and said common point, means for selectively coupling said third signal source being connected between the end of said input impedance nearest said input winding and said common point wherein current flowing therefrom bypasses said input winding, and a load circuit connected in a seires with said output winding and said second signal source.

10. A magnetic core control circuit comprising a first magnetic core unit including a magnetic core having a generally rectangular hysteresis characteristic, an input core winding and an output core winding having a step-up turns ratio, an input circuit connected with said input winding and including a first signal source for generating drive pulses for driving the core from a first to a second state of saturation, a second signal source connected in series with said output winding for continuously generating drive pulses between the drive pulses of said first signal source for driving the core from said second state to said first state of saturation, and circuit means forming a loop circuit including said output winding, said second signal source and load means connected in mutual series circuit relation, said load means including a second magnetic core unit like said first magnetic core unit and including an input winding connected into said loop circuit and an output winding connected externally of said loop circuit, means for controlling the feeding of said drive pulses of said first signal source to the input winding of said first magnetic core unit wherein the drive pulses may be selectively fed or not fed to the latter input winding, relatively large pulses flowing in said loop circuit when the drive pulses from said second signal source are effective to maintain said second state of magnetic saturation in the core of said first magnetic core unit due to the absence of drive pulses in the input winding of the associated core, said large pulses being effective to drive said second magnetic core unit from a first to a second state of saturation, relatively small pulses flowing in said loop circuit when the pulses of said second signal source are operative to drive the core of said first magnetic core unit from said second back to said first state of saturation, the step-up turns ratio of said windings of said first magnetic core unit being at least 4 to 1 where the magnitude of said small signals will be insufficient to drive the core of said second magnetic core unit to the nearest knee point on the hysteresis characteristic thereof even in the absence of external biasing sources, so that the second magnetic core unit will only be driven into said second state of magnetic saturation when the second state of saturation of the first magnetic core unit is maintained by the drive pulses from said second signal source.

References Cited in the file of this patent

UNITED STATES PATENTS

| | | |
|---|---|---|
| 2,710,952 | Steagall | June 14, 1955 |
| 2,798,169 | Eckert | July 2, 1957 |
| 2,807,730 | Kaufmann | Sept. 24, 1957 |
| 2,901,636 | Torrey | Aug. 25, 1959 |
| 2,913,594 | Eckert | Nov. 17, 1959 |
| 2,929,938 | Torrey | Mar. 22, 1960 |
| 2,966,662 | Bonn | Dec. 27, 1960 |

FOREIGN PATENTS

| | | |
|---|---|---|
| 509,089 | Great Britain | July 11, 1939 |